US011683855B2

(12) United States Patent
Ayaz et al.

(10) Patent No.: US 11,683,855 B2
(45) Date of Patent: Jun. 20, 2023

(54) ENTITIES AND METHODS FOR PROVIDING MULTICAST/BROADCAST SERVICES IN 5G NETWORKS

(71) Applicant: Huawei Technologies Co., Ltd., Shenzhen (CN)

(72) Inventors: Serkan Ayaz, Munich (DE); Ishan Vaishnavi, Munich (DE); Riccardo Trivisonno, Munich (DE); Chenghui Peng, Shanghai (CN); Chan Zhou, Munich (DE); Dario Serafino Tonesi, Berlin (DE); Patrice Michel Christophe Hèdé, Issy-les-Moulineaux (FR); Wanqiang Zhang, Beijing (CN); Meng Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/135,510

(22) Filed: Dec. 28, 2020

(65) Prior Publication Data
US 2021/0120627 A1    Apr. 22, 2021

Related U.S. Application Data

(63) Continuation of application No. PCT/EP2019/066909, filed on Jun. 25, 2019.

(30) Foreign Application Priority Data

Jun. 26, 2018 (EP) .................................... 18179840

(51) Int. Cl.
*H04W 76/40* (2018.01)
*H04L 47/2483* (2022.01)
(Continued)

(52) U.S. Cl.
CPC ......... *H04W 76/40* (2018.02); *H04L 47/2483* (2013.01); *H04L 67/146* (2013.01); *H04W 4/08* (2013.01); *H04W 56/001* (2013.01)

(58) Field of Classification Search
None
See application file for complete search history.

(56) References Cited

U.S. PATENT DOCUMENTS

| 7,177,658 B2 | 2/2007 | Willenegger et al. |
| 2004/0042479 A1 | 3/2004 | Epstein et al. |

(Continued)

FOREIGN PATENT DOCUMENTS

| CN | 101884230 A | 11/2010 |
| CN | 104584482 A | 4/2015 |

(Continued)

OTHER PUBLICATIONS

"Solution for broadcast KI," SA WG2 Meeting #128, S2-186842 (Revision of S2-18xxxx), Vilnius, Lithuania, Total 3 pages, 3rd Generation Partnership Project, Valbonne, France (Jul. 2-6, 2018).

(Continued)

*Primary Examiner* — Anh Vu H Ly
(74) *Attorney, Agent, or Firm* — Leydig, Voit & Mayer, Ltd.

(57) ABSTRACT

A control plane network entity for providing a multicast/broadcast service for one or more user equipments in a cellular communication network is provided. The control plane network entity is configured to: receive a session setup request for a multicast/broadcast session for the user equipments, wherein the session setup request comprises one or more identifiers identifying the user equipments and/or one or more spatial regions the user equipments are located in; select one or more access and mobility management function entities of the cellular communication network based on (Continued)

the one or more identifiers for providing the multicast/broadcast session to the user equipments; and send a user plane session setup request to the selected one or more access and mobility management function entities. Moreover, the disclosure relates to a user plane network entity and a radio access network node for anchoring and providing a multicast/broadcast service respectively.

14 Claims, 6 Drawing Sheets

(51) Int. Cl.
*H04L 67/146* (2022.01)
*H04W 4/08* (2009.01)
*H04W 56/00* (2009.01)

(56) References Cited

U.S. PATENT DOCUMENTS

| | | | |
|---|---|---|---|
| 2008/0163309 | A1 | 7/2008 | Kauranen |
| 2008/0212583 | A1 | 9/2008 | Rey et al. |
| 2011/0305183 | A1 | 12/2011 | Hsu et al. |
| 2015/0195684 | A1 | 7/2015 | Lohmar et al. |
| 2017/0078371 | A1 | 3/2017 | Kodaypak |
| 2017/0367098 | A1 | 12/2017 | Byun et al. |
| 2019/0158985 | A1* | 5/2019 | Dao ............... H04L 67/147 |
| 2019/0261260 | A1* | 8/2019 | Dao ............... H04W 36/0011 |
| 2019/0335534 | A1* | 10/2019 | Atarius ............ H04L 65/1006 |
| 2020/0260233 | A1* | 8/2020 | Yang ............... H04W 76/12 |
| 2021/0022063 | A1* | 1/2021 | Yang ............... H04L 45/38 |
| 2021/0058748 | A1* | 2/2021 | Liao ............... H04W 76/11 |
| 2021/0076166 | A1* | 3/2021 | Navratil ............ H04L 67/141 |
| 2021/0120627 | A1* | 4/2021 | Ayaz ............... H04L 47/2483 |
| 2021/0168569 | A1* | 6/2021 | Ayaz ............... H04W 4/06 |
| 2021/0219106 | A1* | 7/2021 | Li ............... H04W 76/40 |

FOREIGN PATENT DOCUMENTS

| | | |
|---|---|---|
| CN | 104854888 A | 8/2015 |
| CN | 105706476 A | 6/2016 |
| CN | 107040898 A | 8/2017 |
| EP | 2326112 A2 | 5/2011 |
| EP | 3018964 A1 | 5/2016 |

OTHER PUBLICATIONS

"3rd Generation Partnership Project; Technical Specification Group Services and System Aspects; Enhancement of 3GPP support for V2X scenarios; Stage 1 (Release 15)," 3GPP TS 22.186 V15.2.0, pp. 1-16, 3rd Generation Partnership Project, Valbonne, France (Sep. 2017).

"Key Issue on Broadcast Support for eV2X," SA WG2 Meeting #128, S2-186986 (Revision of S2-186975, 6841, 5345), Vilnius, Lithuania, pp. 1-2, 3rd Generation Partnership Project, Valbonne, France (Jul. 2-6, 2018).

"3rd Generation Partnership Project; Technical Specification Group Services and System Aspects; System Architecture for the 5G System; Stage 2 (Release 15)," 3GPP TS 23.501 V15.1.0, pp. 1-201, 3rd Generation Partnership Project, Valbonne, France (Mar. 2018).

"3rd Generation Partnership Project; Technical Specification Group Services and System Aspects; Architecture enhancements for V2X services (Release 15)," 3GPP TS 23.285 V15.0.0, pp. 1-36, 3rd Generation Partnership Project, Valbonne, France (Mar. 2018).

"3rd Generation Partnership Project; Technical Specification Group Services and System Aspects; Multimedia Broadcast/Multicast Service (MBMS); Architecture and functional description (Release 15)," 3GPP TS 23.246 V15.0.0, pp. 1-77, 3rd Generation Partnership Project, Valbonne, France (Dec. 2017).

"3rd Generation Partnership Project; Technical Specification Group Radio Access Network; MBMS synchronisation protocol (SYNC) (Release 14)," 3GPP TS 25.446 V14.0.0, pp. 1-22, 3rd Generation Partnership Project, Valbonne, France (Mar. 2017).

"3rd Generation Partnership Project; Technical Specification Group Core Network and Terminals; Group Communication System Enablers for LTE (GCSE_LTE); MB2 Reference Point; Stage 3 (Release 15)," 3GPP TS 29.468 V15.2.0, pp. 1-38, 3rd Generation Partnership Project, Valbonne, France (Dec. 2017).

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," 3GPP TS 36.300 V15.1.0, pp. 1-341, 3rd Generation Partnership Project, Valbonne, France (Mar. 2018).

"3rd Generation Partnership Project; Technical Specification Group Radio Access Network; Evolved Universal Terrestrial Radio Access (E-UTRA); Radio Resource Control (RRC); Protocol specification (Release 15)," 3GPP TS 36.331 V15.1.0, pp. 1-786, 3rd Generation Partnership Project, Valbonne, France (Mar. 2018).

"3rd Generation Partnership Project; Technical Specification Group Radio Access Network; Evolved Universal Terrestrial Radio Access Network (E-UTRAN); M2 Application Protocol (M2AP) (Release 14)," 3GPP TS 36.443 V14.0.1, pp. 1-95, 3rd Generation Partnership Project, Valbonne, France (Apr. 2017).

"3rd Generation Partnership Project; Technical Specification Group Radio Access Network; Evolved Universal Terrestrial Radio Access Network (E-UTRAN); M3 Application Protocol (M3AP) (Release 14)," 3GPP TS 36.444 V14.1.0, pp. 1-66, 3rd Generation Partnership Project, Valbonne, France (Jun. 2017).

"3rd Generation Partnership Project; Technical Specification Group Radio Access Network; Evolved Universal Terrestrial Radio Access Network (E-UTRAN); M1 data transport (Release 14)," 3GPP TS 36.445 V14.0.0, pp. 1-8, 3rd Generation Partnership Project, Valbonne, France (Mar. 2017).

Wu Hai et al., "C-V2X technical framework and key technology research," Telecom Engineering Technics and Standardization, total 6 pages (2018). With English abstract.

Ying Kai, "Research on Multicast/Broadcast Services in Wireless Heterogeneous Networks," Shanghai Jiao Tong University, total 2 pages (2016). With English abstract.

Secretary of SA WG2, "Draft Report of SA WG2 meetings #118," SA WG2 Meeting #119, Dubrovnik, Croatia, S2-170702, total 386 pages (Feb. 13-17, 2017).

"3rd Generation Partnership Project; Technical Specification Group Services and System Aspects; Service requirements for V2X services; Stage 1(Release 14)," 3GPP TS 22.185 V14.3.0, total 14 pages, 3rd Generation Partnership Project, Valbonne, France (Mar. 2017).

* cited by examiner

ENTITIES AND METHODS FOR PROVIDING MULTICAST/BROADCAST SERVICES IN 5G NETWORKS

CROSS-REFERENCE TO RELATED APPLICATIONS

This application is a continuation of International Application No. PCT/EP2019/066909, filed on Jun. 25, 2019, which claims priority to European Patent Application No. EP18179840.6, filed on Jun. 26, 2018. The disclosures of the aforementioned applications are hereby incorporated by reference in their entireties.

TECHNICAL FIELD

Generally, the present disclosure relates to the field of telecommunications. More specifically, the present disclosure relates to entities, systems and methods for providing multicast/broadcast services in communication networks, in particular 5G networks.

BACKGROUND

The 3GPP LTE system architecture supports multicast/broadcast services by using a stand-alone architecture which is called multimedia broadcast multicast service (MBMS) architecture. This architecture, which is described in 3GPP TS 23.246 v15.0.0, comprises as main components a Broadcast Multicast Service Center (BM-SC) server, a Multimedia Broadcast Multicast Services Gateway (MBMS GW) and a Multicell/Multicast Coordination Entity (MCE). The 3GPP LTE MBMS architecture supports two different operation modes, namely a single-cell point-to-multipoint (SC-PTM) mode and a Multimedia Broadcast Multicast Service over Single Frequency Network (MBSFN) mode. In the MBSFN mode, multiple cells are synchronized and create a single frequency network to perform multicast broadcast transmissions. On the other hand, in the SC-PTM mode, each cell is served independently without synchronizing to other cells. Each MBMS session/bearer may have the context/session attributes described in 3GPP TS 23.246 v15.0.0.

The 5G system architecture currently specified in 3GPP TS 23.501 v15.1.0 does not provide multicast/broadcast service capabilities. However, multicast/broadcast services are essential for different use cases (e.g., V2X scenarios specified in 3GPP TS 22.186 v15.2.0). For this reason, it would be desirable to extend the 5G system architecture so as to support these types of multicast/broadcast services. Although there have been some suggestions for supporting multicast and broadcast services in a 5G communication network, there is still a need for entities, systems and methods for providing multicast/broadcast services in a communication network, in particular a 5G communication network in an efficient manner.

SUMMARY

Embodiments of the disclosure are defined by the features of the independent claims. Further advantageous implementations of the embodiments are defined by the features of the dependent claims.

Generally, embodiments of the disclosure allow providing multicast/broadcast services in a cellular communication network in an efficient manner.

More specifically, according to a first aspect the disclosure relates to a control plane network entity for providing a multicast/broadcast service for one or more user equipments in a cellular communication network, wherein the cellular communication network comprises a core network, CN, and a radio access network, RAN, and is configured to provide a control plane, CP, and a user plane, UP. The control plane network entity is configured to: receive a session setup request for a multicast/broadcast session for the one or more user equipments, wherein the session setup request comprises one or more identifiers identifying the one or more user equipments and/or one or more spatial regions the one or more user equipments are located in; select one or more further control plane network entities, in particular one or more access and mobility management function, AMF, entities (herein referred to as group AMF(s), i.e. G-AMF(s)), of the cellular communication network on the basis of the one or more identifiers for providing the multicast/broadcast session to the one or more user equipments; and send a user plane session setup request to the selected one or more further control plane network entities, in particular one or more group AMF entities for establishing the multicast/broadcast session. As will be described in more detail below, the user plane session setup request, in turn, will be forwarded to a RAN node of the cellular communication network.

In a further possible implementation form of the first aspect, the control plane network entity is further configured to send a user plane session configuration request to a user plane network entity, in particular a user plane function, UPF, of the cellular communication network, in response to receiving a user plane session setup confirmation from the selected one or more further control plane network entities, in particular the selected one or more group AMF entities.

In a further possible implementation form of the first aspect, the session setup request and/or the user plane session configuration request includes one or more session attributes, in particular a multicast/broadcast session identifier, QoS information, one or more tunnel end point identifiers, TEID, for the control plane and/or user plane, a temporary mobile group identity, TMGI, a flow identifier, an estimate of the session duration, session start time, and/or the one or more identifiers identifying the one or more user equipments and/or the one or more spatial regions the one or more user equipments are located in.

In a further possible implementation form of the first aspect, the one or more identifiers identify one or more communication cells of the cellular communication network, one or more RAN nodes, in particular base stations of the cellular communication network defining the one or more communication cells and/or a multicast/broadcast session area comprising a plurality of communication cells of the cellular communication network.

In a further possible implementation form of the first aspect, the control plane network entity is configured to receive the session setup request for the multicast/broadcast session for the one or more user equipments from an application server, AS, application function, AF, and/or network exposure function; NEF, of the cellular communication network.

In a further possible implementation form of the first aspect, the control plane network entity is implemented as or a part of a session management function, SMF, a V2X control function or a policy control function, PCF, of the cellular communication network. For instance, in an implementation form, the control plane network entity can be implemented as a PCF which may include a V2X control functionality as well.

According to a second aspect the disclosure relates to a corresponding method for providing a multicast/broadcast service for one or more user equipments in a cellular communication network, wherein the cellular communication network comprises a core network, CN, and a radio access network, RAN, and is configured to provide a control plane, CP, and a user plane, UP. The method comprises the steps of: receiving a session setup request for a multicast/broadcast session for the one or more user equipments by a control plane network entity, wherein the session setup request comprises one or more identifiers identifying the one or more user equipments and/or one or more spatial regions the one or more user equipments are located in; selecting one or more further control plane network entities, in particular one or more group access and mobility management function, AMF, entities, of the cellular communication network on the basis of the one or more identifiers for providing the multicast/broadcast session to the one or more user equipments; and sending a user plane session setup request to the selected one or more further control plane network entities, in particular the one or more group AMF entities for establishing the multicast/broadcast session.

The method according to the second aspect of the disclosure can be performed by the control plane network entity according to the first aspect of the disclosure. Further features of the method according to the second aspect of the disclosure result directly from the functionality of the control plane network entity according to the first aspect of the disclosure and its different implementation forms described above and below.

According to a third aspect the disclosure relates to a user plane network entity for anchoring a multicast/broadcast service for one or more user equipments in a cellular communication network, wherein the cellular communication network comprises a core network, CN, and a radio access network, RAN, and is configured to provide a control plane, CP, and a user plane, UP. The user plane network entity is configured to: receive a user plane session configuration request from a control plane network entity, in particular a session management function, SMF, of the cellular communication network (herein also referred to as group SMF), wherein the user plane session configuration request includes one or more session attributes; and establish the user plane on the basis of the one or more session attributes between the core network and a radio access network node of the radio access network of the cellular communication network.

In a further possible implementation form of the third aspect, the user plane network entity is configured, once the user plane has been established, to receive one or more data packets of the multicast/broadcast service from an application server, AS, application function, AF, and/or network exposure function, NEF, of the cellular communication network and to forward the one or more data packets towards the radio access network node of the cellular communication network.

In a further possible implementation form of the third aspect, the user plane network entity is configured to forward the one or more data packets as one or more IP multicast packets towards the radio access network node of the cellular communication network.

In a further possible implementation form of the third aspect, the user plane network entity is configured to forward synchronization information to the radio access network node of the cellular communication network for synchronizing the multicast/broadcast session.

In a further possible implementation form of the third aspect, the one or more session attributes comprise a multicast/broadcast session identifier, QoS information, one or more tunnel end point identifiers, TEID, for the control plane and/or user plane, a temporary mobile group identity, TMGI, a flow identifier, an estimate of the session duration, session start time, list of control plane network entities, list of user plane network entities, and/or one or more identifiers identifying the one or more user equipments and/or the one or more spatial regions the one or more user equipments are located in.

In a further possible implementation form of the third aspect, the user plane network entity is implemented as or a part of a user plane function, UPF, of the cellular communication network.

According to a fourth aspect the disclosure relates to a corresponding method for anchoring a multicast/broadcast service for one or more user equipments in a cellular communication network, wherein the cellular communication network comprises a core network, CN, and a radio access network, RAN, and is configured to provide a control plane, CP, and a user plane, UP. The method comprises the steps of: receiving by a user plane network entity a user plane session configuration request from a control plane network entity, in particular a group session management function, SMF, of the cellular communication network, wherein the user plane session configuration request includes one or more session attributes; and establishing a user plane on the basis of the one or more session attributes between the core network and a radio access network node of the cellular communication network.

The method according to the fourth aspect of the disclosure can be performed by the user plane network entity according to the third aspect of the disclosure. Further features of the method according to the fourth aspect of the disclosure result directly from the functionality of the user plane network entity according to the third aspect of the disclosure and its different implementation forms described above and below.

According to a fifth aspect the disclosure relates to a radio access network node for providing a multicast/broadcast service for one or more user equipments in a cellular communication network, wherein the cellular communication network comprises a core network, CN, and a radio access network, RAN, and is configured to provide a control plane, CP, and a user plane, UP. The radio access network node is configured to: receive one or more session attributes from a further control plane network entity, in particular a group access and mobility management function, AMF, entity, of the cellular communication network; receive one or more data packets of the multicast/broadcast service from a user plane network entity, in particular a user plane function, UPF, of the cellular communication network; and forward the one or more data packets to the one or more user equipments on the basis of the one or more session attributes. In an implementation form, the RAN node according to the fifth aspect can be a base station, a base station with a split configuration having a central unit and a distributed unit or a master base station and a secondary base station in a dual connectivity configuration.

In a further possible implementation form of the fifth aspect, the one or more session attributes comprise a multicast/broadcast session identifier, QoS information, one or more tunnel end point identifiers, TEID, for the control plane and/or user plane, a temporary mobile group identity, TMGI, a flow identifier, an estimate of the session duration, session start time, list of control plane network entities, list of user plane network entities, and/or one or more identifiers identifying the one or more user equipments and/or the one or more spatial regions the one or more user equipments are located in.

In a further possible implementation form of the fifth aspect, the radio access network node is further configured to receive synchronization information from the user plane network entity and to synchronize the multicast/broadcast session on the basis of the synchronization information.

According to a sixth aspect the disclosure relates to a corresponding method for providing a multicast/broadcast service for one or more user equipments in a cellular communication network, wherein the cellular communication network comprises a core network, CN, and a radio access network, RAN, and is configured to provide a control plane, CP, and a user plane, UP. The method comprises the steps of: receiving by a radio access network node one or more session attributes from a further control plane network entity, in particular a group access and mobility management function, AMF, entity, of the cellular communication network; receiving one or more data packets of the multicast/broadcast service from a user plane network entity, in particular a user plane function, UPF, of the cellular communication network; and forwarding the one or more data packets to the one or more user equipments on the basis of the one or more session attributes.

The method according to the sixth aspect of the disclosure can be performed by the radio access network node according to the fifth aspect of the disclosure. Further features of the method according to the sixth aspect of the disclosure result directly from the functionality of the RAN node according to the fifth aspect of the disclosure and its different implementation forms described above and below.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the disclosure are described in more detail with reference to the attached figures and drawings, in which.

In the following identical reference signs refer to identical or at least functionally equivalent features.

DETAILED DESCRIPTION OF THE EMBODIMENTS

In the following description, reference is made to the accompanying figures, which form part of the disclosure, and which show, by way of illustration, specific aspects of embodiments of the disclosure or specific aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Figure 1:
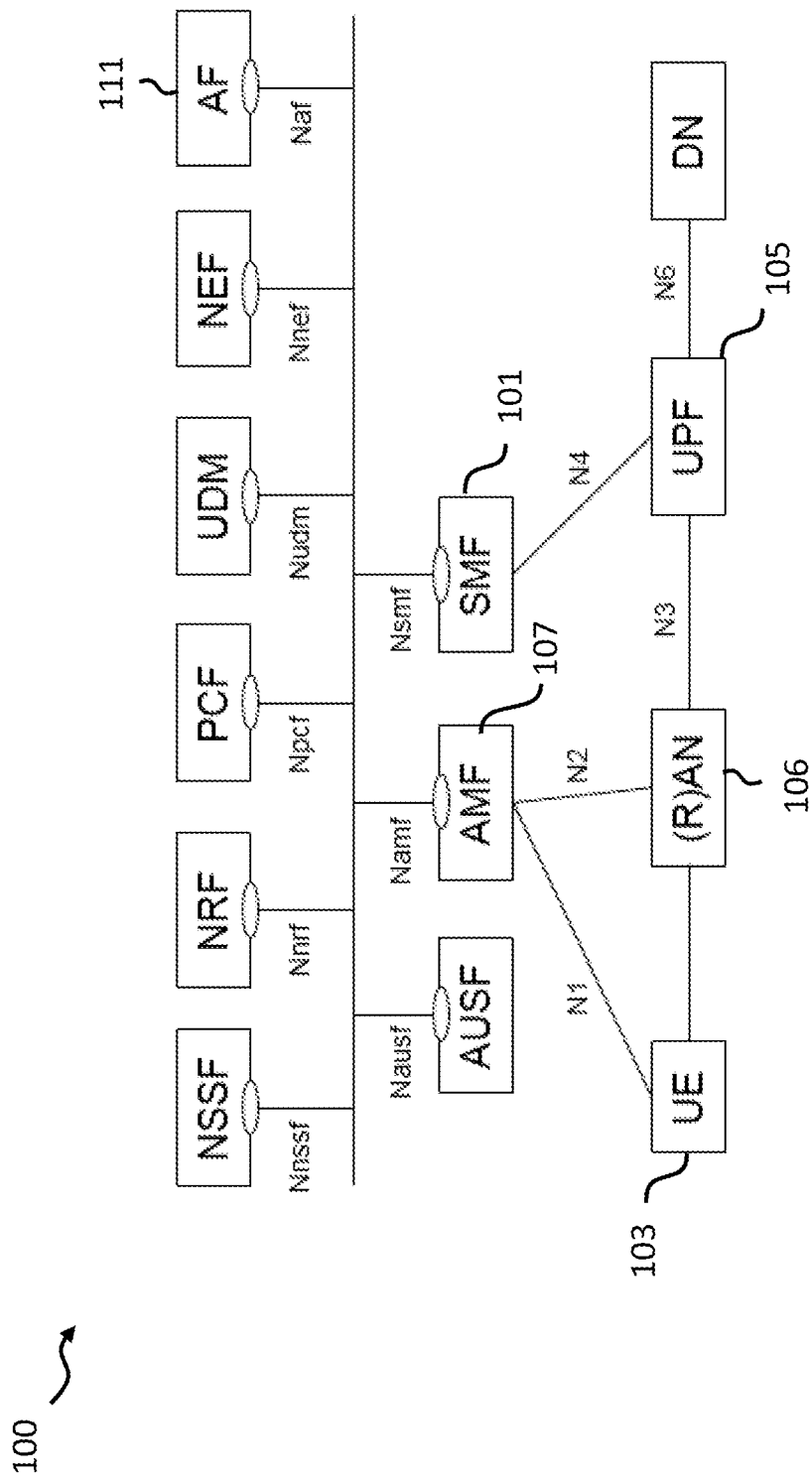
FIG. 1 is a schematic diagram illustrating the conventional architecture of a 5G communication network.

In order to set the stage for describing different aspects of the disclosure reference is made to FIG. 1, which illustrates the architecture of a conventional 5G communication network 100, as defined, for instance, in 3GPP TS 23.501 v15.1.0. In this architecture, service-based interfaces (SBIs) are used within the control plane (CP). Furthermore, the following main interfaces (reference points) are defined: N1, i.e. the reference point between a user equipment (UE) 103 and the access and mobility management function (AMF) 107; N2, i.e. the reference point between the radio access network ((R)AN) 106 and the AMF 107; N3, i.e. the reference point between the (R)AN 106 and a user plane function (UPF) 105; N4, i.e. the reference point between a session management function (SMF) 101 and the UPF 105; N6, i.e. the reference point between the UPF and a data network (DN); and N9, i.e. the reference point between two UPFs.

Figure 2:
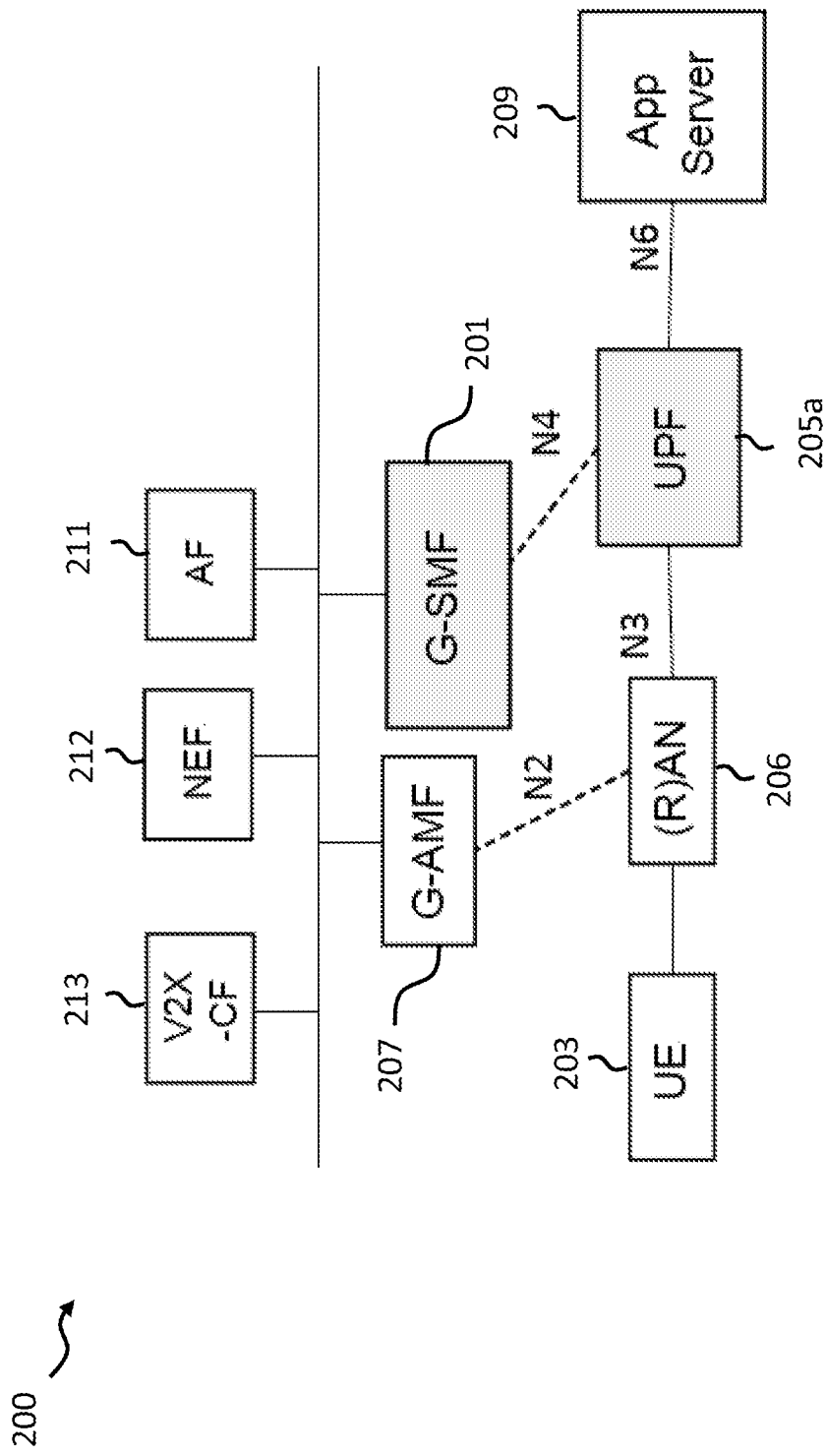
FIG. 2 is a schematic diagram showing an exemplary architecture of a cellular communication network comprising network entities according to an embodiment for providing a multicast/broadcast service to a user equipment.

FIG. 2 is a schematic diagram showing an exemplary architecture of a cellular communication network 200 comprising a control plane network entity 201 according to an embodiment for providing a multicast/broadcast service to one or more user equipments 203. As illustrated in FIG. 2, the control plane network entity 201 can be referred to as a group session management function, G-SMF, 201, because it can be considered to be an extension of the SMF 101 of the conventional 5G communication network illustrated in FIG. 1 (as will be described in more detail further below). According to further embodiments, the control plane network entity can be implemented as or a part of the V2X control function 213 or a policy control function, PCF, of the cellular communication network.

In addition to the control plane network entity, in particular G-SMF 201 the cellular communication network 200 comprises as a further new component a further control plane network entity 207, in particular an access and mobility management function (AMF) entity 207. As this AMF entity 207 can be considered to be an extension of the AMF 107 of the conventional 5G communication network illustrated in FIG. 1 (as will be described in more detail further below), it is referred to in FIG. 2 as a group-access and mobility management function (G-AMF) entity 207.

Generally, as will be described in more detail below, the G-AMF 207 and G-SMF 201 are mainly handling all control plane functionalities of setting up, modifying and tearing down a multicast/broadcast session as requested by an application server (AS) 209 or application function (AF) 211 (possibly via a network exposure function 212) or by a control function 213, in particular a V2X control function (V2XCF) 213 or a policy control function which may include the V2XCF 213 functionality.

Figure 3:
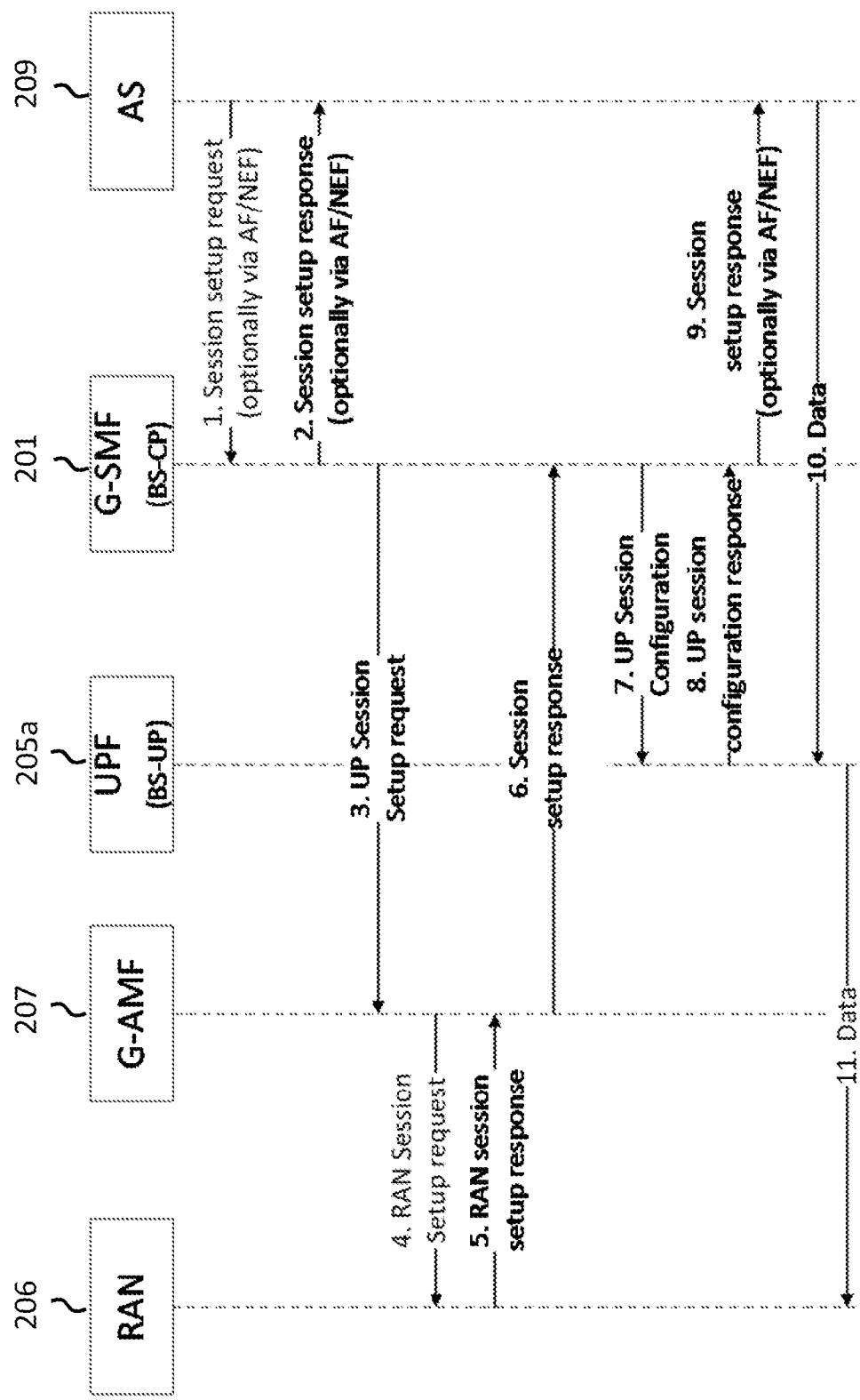
FIG. 3 is a signaling diagram illustrating steps performed by network entities according to an embodiment within the exemplary network architecture of FIG. 2 for providing a multicast/broadcast service to a user equipment.

Under further reference to FIG. 3, the control plane network entity 201, in particular G-SMF 201 is configured to receive a session setup request for a multicast/broadcast session for the one or more user equipments 203 (see step 1 of FIG. 3) from the AS 209. The session setup request comprises one or more identifiers identifying the one or more user equipments 203 and/or one or more spatial regions the one or more user equipments 203 are located in. According to an alternative embodiment, such a session setup request could be received via the AF 211 or the NEF 212. As illustrated by step 2 of FIG. 3, in an embodiment, the control plane network entity 201, in particular G-SMF 201 can be configured to send a session setup response (optionally via the AF 211 or NEF 212) to the AS 209 for confirming, if the request is valid/allowable, or declining the session setup request.

In an embodiment, the one or more identifiers identify one or more communication cells of the cellular communication network 200, one or more RAN nodes 206, in particular base stations of the cellular communication network 200 defining the one or more communication cells and/or a multicast/broadcast session area comprising a plurality of communication cells of the cellular communication network 200. In an embodiment, the one or more identifiers comprises one or more service area identifiers, SAI(s), and/or a cell ID list.

In an embodiment, the AS 209 or AF 211 can select the appropriate G-SMF 201 using a network repository function, NRF.

If the session setup request is confirmed, the control plane network entity 201, in particular G-SMF 201 is further configured to select one or more further control plane network entities 207, in particular one or more of the group access and mobility management functions, AMF, 207 of the cellular communication network 200, namely those group AMF(s) 207 managing the one or more user equipments 203, on the basis of the one or more identifiers for providing the multicast/broadcast session to the one or more user equipments 203.

Once the control plane network entity 201, in particular G-SMF 201 has selected the appropriate G-AMF(s) 207, it will send a user plane session setup request to the selected G-AMF(s) 207 for establishing the multicast/broadcast session, as illustrated in step 3 of FIG. 3. As illustrated in step 4 of FIG. 3, the selected G-AMF(s) 207 are configured to forward the user plane session setup request and at least part of its content as a RAN session setup request to the appropriate RAN node(s) 206. In response, the respective RAN node(s) can send a RAN session setup response to the selected G-AMF(s) 207 (see step 5 of FIG. 3).

Thus, the one or more RAN node(s) 206 are configured to receive the one or more session attributes from the selected G-AMF(s) 207 as part of the RAN session setup request (see step 4 of FIG. 3). The one or more RAN node(s) 206 can be implemented, for instance, as a base station, a central unit and distributed unit in split configuration or a master base station and a secondary base station in a dual connectivity configuration.

As illustrated in steps 6 and 7 of FIG. 3, the control plane network entity, in particular G-SMF 201 is further configured to send a UP session configuration request to a user plane network entity 205a, in particular a user plane function, UPF, of the cellular communication network 200, in response to receiving a user plane session setup confirmation from the selected G-AMF(s) 207.

The user plane session configuration request sent by the control plane network entity, in particular G-SMF 201 in step 7 of FIG. 3 can include one or more session attributes, in particular a multicast/broadcast session identifier, QoS information, one or more tunnel end point identifiers, TEID, for the control plane and/or user plane, a temporary mobile group identity, TMGI, a flow identifier, an estimate of the session duration, session start time, and/or the one or more identifiers identifying the one or more user equipments 203 and/or the one or more spatial regions the one or more user equipments 203 are located in. In an embodiment, one or more of these session attributes can be provided by means of the session setup request received by the control plane network entity 201, in particular G-SMF 201 in step 1 of FIG. 3, for instance, from the AS 209. In addition to the session attributes mentioned above, the session setup request further can comprise a list of control plane network entities and/or a list of user plane network entities as session attributes.

Thus, as illustrated in step 7 of FIG. 3, the user plane network entity, in particular UPF 205a is configured to receive the user plane session configuration request from the G-SMF 201, wherein the user plane session configuration request includes the one or more session attributes. On the basis of these one or more session attributes the UPF 205a is configured to establish a user plane between the core network of the cellular communication network 200 and its RAN, more specifically the RAN node(s) 206 for anchoring the multicast/broadcast service for the user equipment(s) 203.

In response to the user plane session configuration request and a successful configuration and instantiation of the user/data plane, the user plane network entity, in particular UPF 205a can send a UP session configuration response to the G-SMF 201 (see step 8 of FIG. 3). As illustrated by step 9 of FIG. 3, the G-SMF 201, in turn, can send a session setup response to the AS 209 (optionally via the AF 211 and/or the NEF 212) to indicate to the AS 209 that UP data can be provided via the appropriate multicast/broadcast channel.

As illustrated in steps 10 and 11 of FIG. 3, the user plane network entity, in particular UPF 205a is further configured, once the user plane has been established (i.e. steps 1 to 9 of FIG. 3 have been performed), to receive one or more data packets of the multicast/broadcast service from the application server 209 (optionally via the AF 211 and/or the NEF 212) of the cellular communication network 200 and to forward the one or more data packets towards the RAN node(s) 206 of the cellular communication network 200. The one or more RAN node(s) 206, in turn, are configured to forward the one or more data packets to the one or more user equipments 203 on the basis of the one or more session attributes provided by the selected G-AMF(s) 207 in step 4 of FIG. 3.

According to an embodiment, the UPF 205a is configured to forward the one or more data packets as one or more IP multicast packets towards the RAN node(s) 206. According to a further embodiment, the UPF 205a is configured to forward synchronization information to the RAN node(s) 206 of the cellular communication network 200 for synchronizing the multicast/broadcast session.

Figure 4:
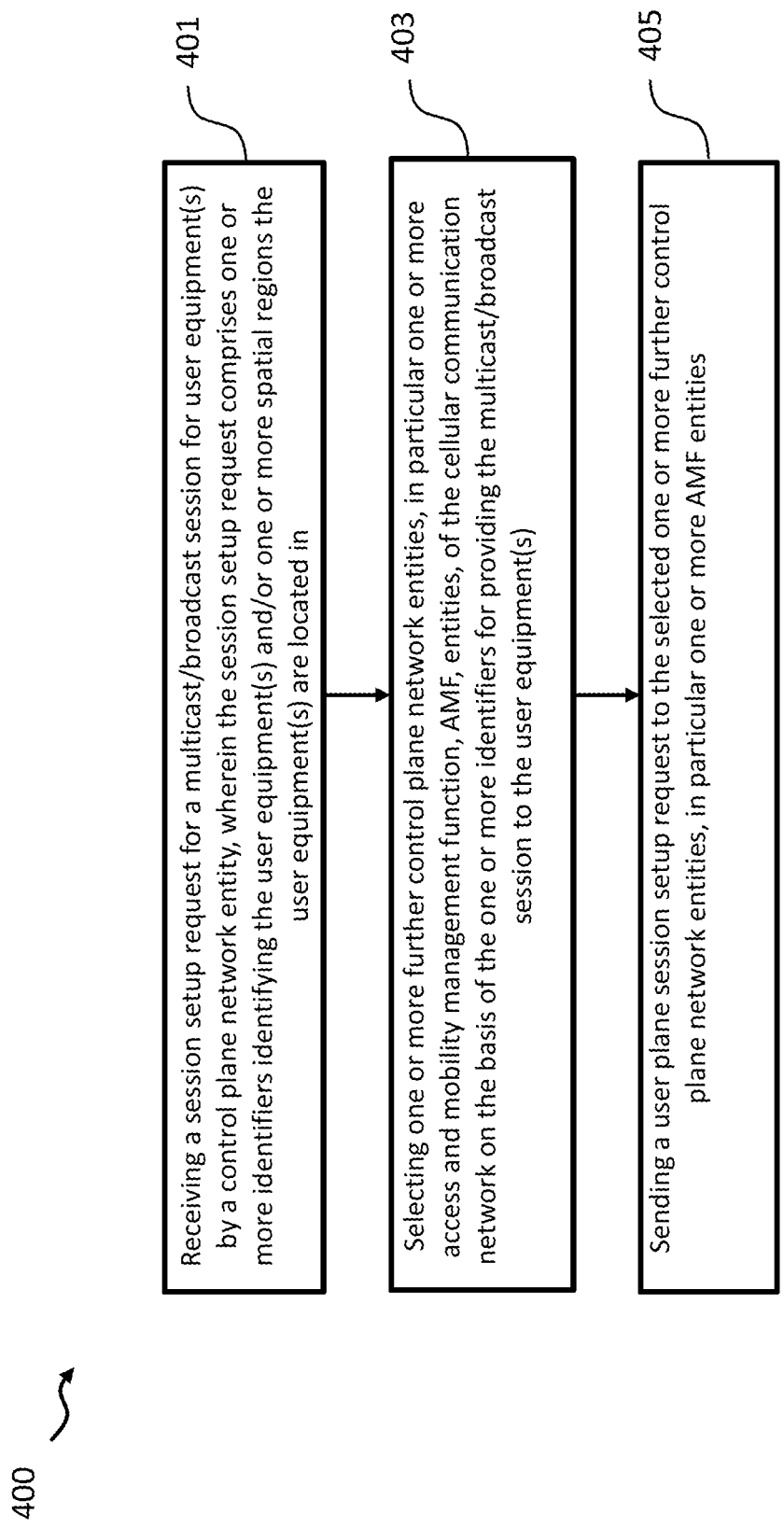
FIG. 4 is a flow diagram showing an example of processing steps of a method for providing a multicast/broadcast service according to an embodiment.

FIG. 4 is a flow diagram showing an example of processing steps of a method 400 for providing a multicast/broadcast service according to an embodiment. The method 400, which can be performed by the control plane network entity, in particular G-SMF 201 of FIGS. 2 and 3, comprises the following steps.

A step 401 of receiving a session setup request for a multicast/broadcast session for the one or more user equipments 203 by the control plane network entity 201, wherein the session setup request comprises one or more identifiers identifying the one or more user equipments 203 and/or one or more spatial regions the one or more user equipments 203 are located in.

A further step 403 of selecting one or more further control plane network entities 207, in particular one or more G-AMF(s) 207 of the cellular communication network 200 on the basis of the one or more identifiers for providing the multicast/broadcast session to the one or more user equipments 203.

A further step 405 of sending 405 a user plane session setup request to the selected one or more further control plane network entities 207, in particular one or more G-AMF(s) 207 for establishing the multicast/broadcast session.

Figure 5:
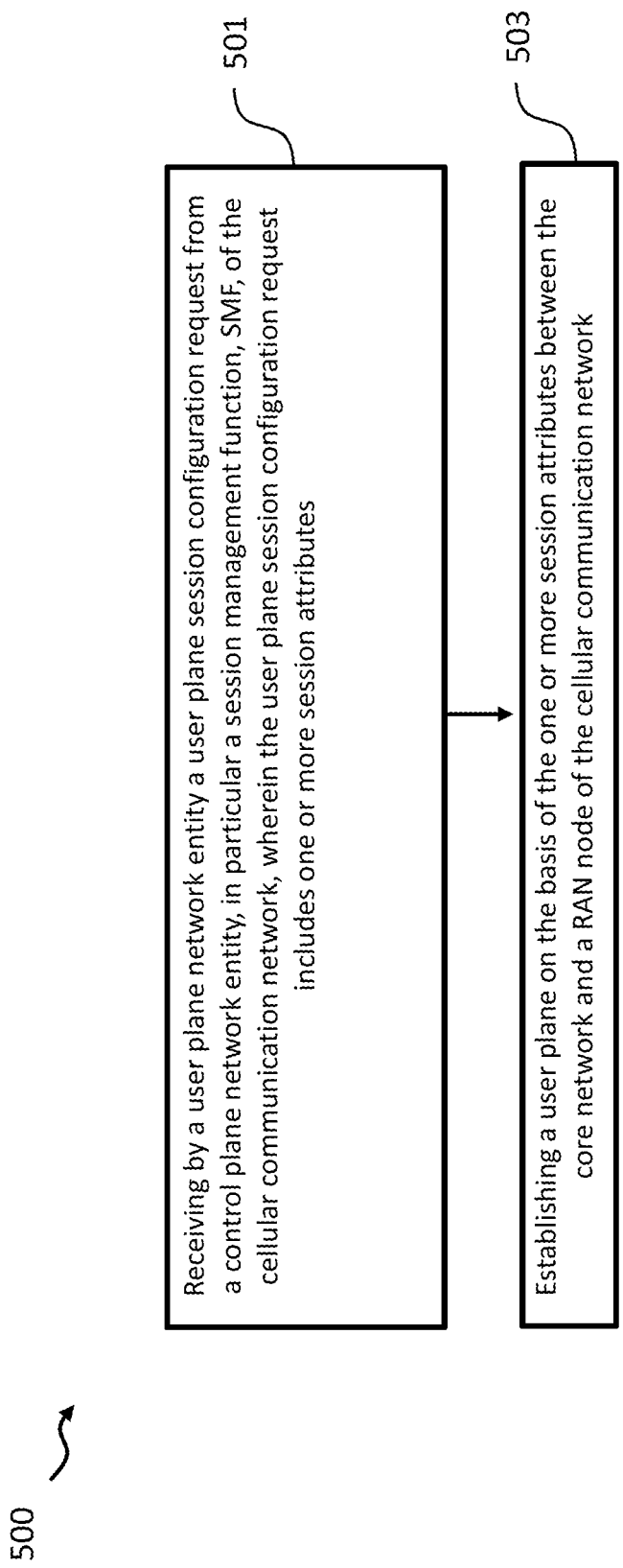
FIG. 5 is a flow diagram showing an example of processing steps of a method of anchoring a multicast/broadcast service according to an embodiment.

FIG. 5 is a flow diagram showing an example of processing steps of a method 500 for anchoring a multicast/broadcast service in the cellular communication network 200 according to an embodiment. The method 500, which can be performed by the user plane network entity, in particular UPF 205a of FIGS. 2 and 3, comprises the following steps.

A step 501 of receiving by the user plane network entity, in particular UPF 205a a user plane session configuration request from the control plane network entity, in particular G-SMF 201 of the cellular communication network 200, wherein the user plane session configuration request includes one or more session attributes.

A step 503 of establishing a user plane on the basis of the one or more session attributes between the core network and the RAN node(s) 206 of the cellular communication network.

Figure 6:
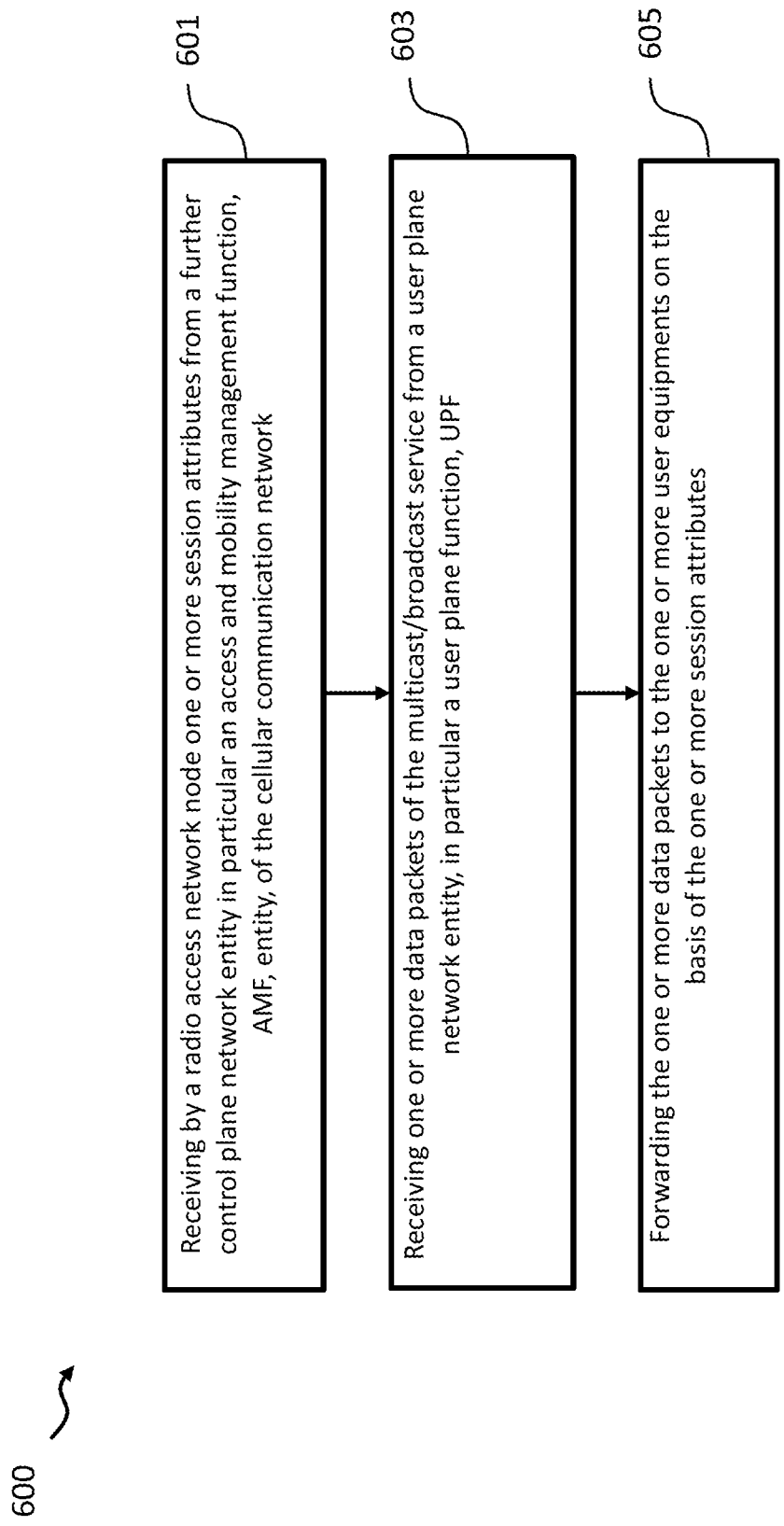
FIG. 6 is a flow diagram showing an example of processing steps of a method for providing a multicast/broadcast service according to an embodiment.

FIG. 6 is a flow diagram showing an example of processing steps of a method 600 for providing a multicast/broadcast service according to an embodiment. The method 600, which can be performed by the RAN node(s) 206 of FIGS. 2 and 3, comprises the following steps.

A step 601 of receiving by the RAN node(s) 206 one or more session attributes from the further control plane network entity 207, in particular the selected G-AMF(s) 207 of the cellular communication network 200.

A step 603 of receiving one or more data packets of the multicast/broadcast service from the user plane network entity, in particular UPF 205a.

A step 605 of forwarding the one or more data packets to the one or more user equipments 203 on the basis of the one or more session attributes.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

Embodiments of the disclosure may further comprise an apparatus, which comprises processing circuitry configured to perform any of the methods and/or processes described herein.

What is claimed is:

1. A control plane network entity for providing a multicast/broadcast service for one or more user equipments in a cellular communication network, wherein the cellular communication network comprises a core network (CN) and a radio access network (RAN), and is configured to provide a control plane (CP) and a user plane (UP), wherein the control plane network entity comprises a memory and a processor coupled to the memory, wherein the memory stores a program code, and when the program code is executed by the processor, the control plane network entity is configured to:
 receive a session setup request for a multicast/broadcast session for the one or more user equipments from an application server (AS) of the cellular communication network,
  wherein the control plane network entity is selected by the AS using a network repository function (NRF);
  wherein the session setup request comprises one or more identifiers identifying the one or more user equipments, and one or more spatial regions in which the one or more user equipments are located;
 select one or more access and mobility management function entities of the cellular communication network on the basis of the one or more identifiers, for providing the multicast/broadcast session to the one or more user equipments;
 send a user plane session setup request to the selected one or more access and mobility management function entities; and
 send a user plane session configuration request to a user plane function (UPF) of the cellular communication network in response to receiving a user plane session setup confirmation from the selected one or more access and mobility management function entities, and
 wherein the user plane session configuration request comprises one or more session attributes, based on which the UPF is configured to establish a user plane between the CN and a RAN node of the RAN, wherein the one or more session attributes comprise the one or more spatial regions in which the one or more user equipments are located and one or more identifiers identifying the one or more user equipments, and
 wherein the RAN node anchors the multicast/broadcast session for the one or more user equipments.

2. The control plane network entity of claim 1, wherein one or both of the session setup request and the user plane session configuration request includes the one or more session attributes, and wherein the one or more session attributes comprises at least one of: a multicast/broadcast session identifier, quality of service (QoS) information, one or more tunnel end point identifiers (TEID) for the control plane and/or user plane, a temporary mobile group identity (TMGI), a flow identifier, an estimate of a session duration, a session start time, a list of control plane network entities, a list of user plane network entities.

3. The control plane network entity of claim 1, wherein the one or more identifiers identify one or more communication cells of the cellular communication network, one or more RAN nodes defining one or both of the one or more communication cells and a multicast/broadcast session area comprising a plurality of communication cells of the cellular communication network.

4. The control plane network entity of claim 1, wherein when the program code is executed by the processor, the control plane network entity is configured to receive the session setup request for the multicast/broadcast session for the one or more user equipments from one or more of the AS, an application function (AF), and a network exposure function (NEF) of the cellular communication network.

5. The control plane network entity of claim 1, wherein the control plane network entity is implemented as or as a part of a session management function (SMF), a V2X control function, or a policy control function (PCF) of the cellular communication network.

6. A user plane network entity for anchoring a multicast/broadcast service for one or more user equipments in a cellular communication network, wherein the cellular communication network comprises a core network (CN) and a radio access network (RAN), and is configured to provide a control plane (CP) and a user plane (UP), wherein the user plane network entity comprises a memory and a processor coupled to the memory, wherein the memory stores a program code, and when the program code is executed by the processor, the user plane network entity is configured to:
receive a user plane session configuration request from a control plane network entity of the cellular communication network after receiving a session setup request for a multicast/broadcast session for the one or more user equipments from an application server (AS) of the cellular communication network,
wherein the control plane network entity is selected by the AS using a network repository function (NRF);
wherein the user plane session configuration request includes one or more session attributes; and
establish the user plane, on the basis of the one or more session attributes, between the CN and a RAN node of the RAN of the cellular communication network, and
wherein the RAN node anchors the multicast/broadcast service for the one or more user equipments, and
wherein the one or more session attributes comprise one or more spatial regions in which the one or more user equipments are located and one or more identifiers identifying the one or more user equipments.

7. The user plane network entity of claim 6, wherein when the program code is executed by the processor, the user plane network entity is configured, once the user plane has been established, to receive one or more data packets of the multicast/broadcast service from one or more of an application server (AS), an application function (AF), and a network exposure function (NEF) of the cellular communication network and to forward the one or more data packets to the RAN node of the cellular communication network.

8. The user plane network entity of claim 7, wherein when the program code is executed by the processor, the user plane network entity is configured to forward the one or more data packets as one or more IP multicast packets to the RAN node of the cellular communication network.

9. The user plane network entity of claim 6, wherein when the program code is executed by the processor, the user plane network entity is configured to forward synchronization information to the RAN node of the cellular communication network for synchronizing the multicast/broadcast service.

10. The user plane network entity of claim 6, wherein the one or more session attributes comprise at least one of: a multicast/broadcast session identifier, quality of service (QoS) information, one or more tunnel end point identifiers (TEID) for the control plane and/or user plane, a temporary mobile group identity (TMGI), a flow identifier, an estimate of a session duration.

11. The user plane network entity of claim 6, wherein the user plane network entity is implemented as or as a part of a user plane function (UPF) of the cellular communication network.

12. A radio access network node for providing a multicast/broadcast service for one or more user equipments in a cellular communication network, wherein the cellular communication network comprises a core network (CN) and a radio access network (RAN), and is configured to provide a control plane (CP) and a user plane (UP), wherein the radio access network node comprises a memory and a processor coupled to the memory, wherein the memory stores a program code, and when the program code is executed by the processor, the radio access network node is configured to:
receive one or more session attributes from an access and mobility management function entity of the cellular communication network after a control plane network entity of the cellular communication network receives a session setup request for a multicast/broadcast session for the one or more user equipments from an application server (AS) of the cellular communication network,
wherein the control plane network entity is selected by the AS using a network repository function (NRF);
receive one or more data packets of the multicast/broadcast service from a user plane network entity, wherein the radio access network node anchors the multicast/broadcast service for the one or more user equipments; and
forward the one or more data packets to the one or more user equipments on the basis of the one or more session attributes, and
wherein the one or more session attributes comprise one or more spatial regions in which the one or more user equipments are located and one or more identifiers identifying the one or more user equipments.

13. The radio access network node of claim 12, wherein the one or more session attributes comprise at least one of: a multicast/broadcast session identifier, quality of service (QoS) information, one or more tunnel end point identifiers (TEID) for the control plane and/or user plane, a temporary mobile group identity (TMGI), a flow identifier, an estimate of a session duration, a session start time.

14. The radio access network node of claim 12, wherein when the program code is executed by the processor, the radio access network node is further configured to receive synchronization information from the user plane network entity and to synchronize the multicast/broadcast service on the basis of the synchronization information.

\* \* \* \* \*